Jan. 15, 1952     E. M. BROWN ET AL     2,582,229
POWER-DRIVEN PALM-GRASPED KITCHEN APPLIANCE
Filed Dec. 23, 1949     2 SHEETS—SHEET 1
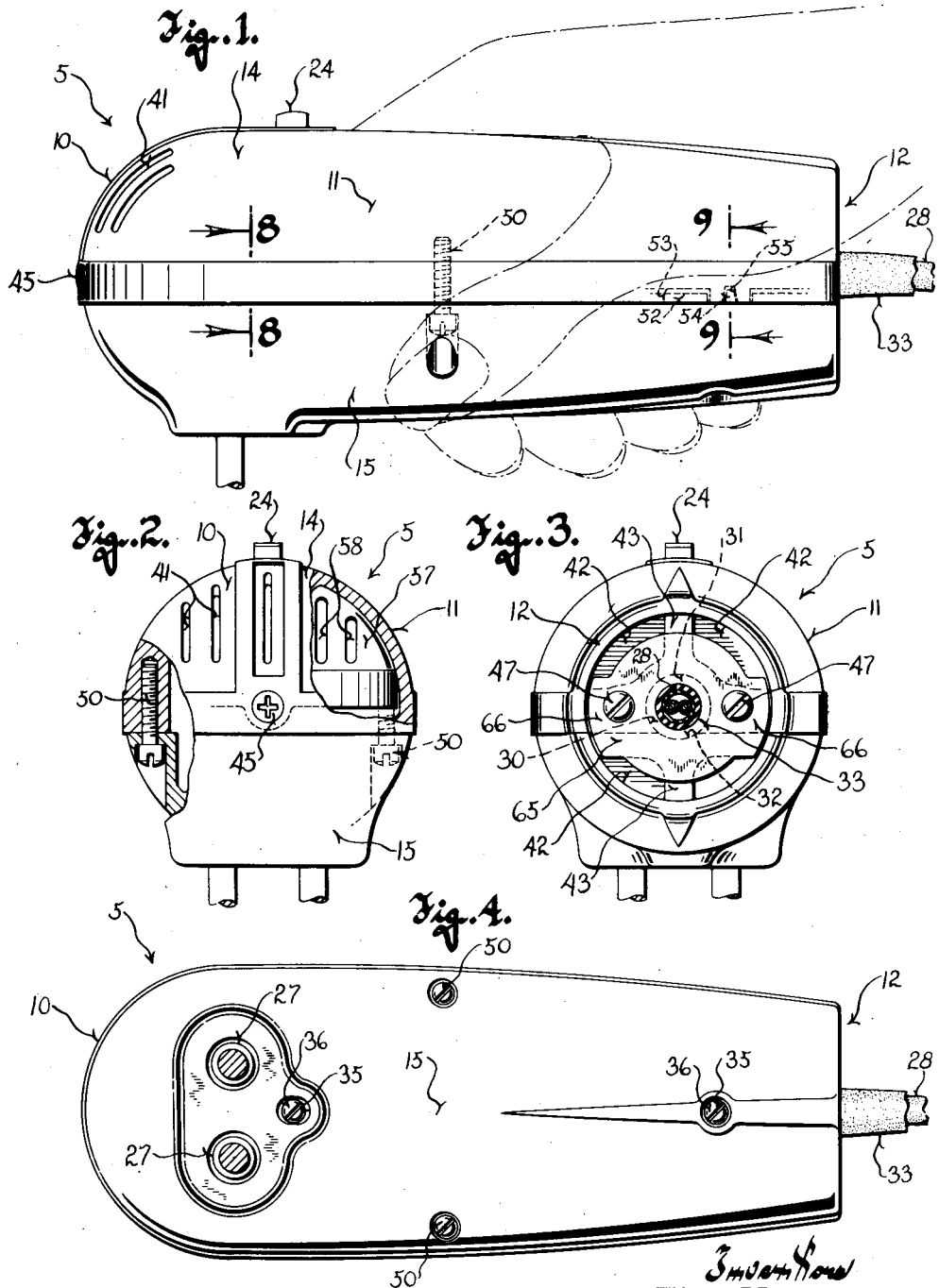

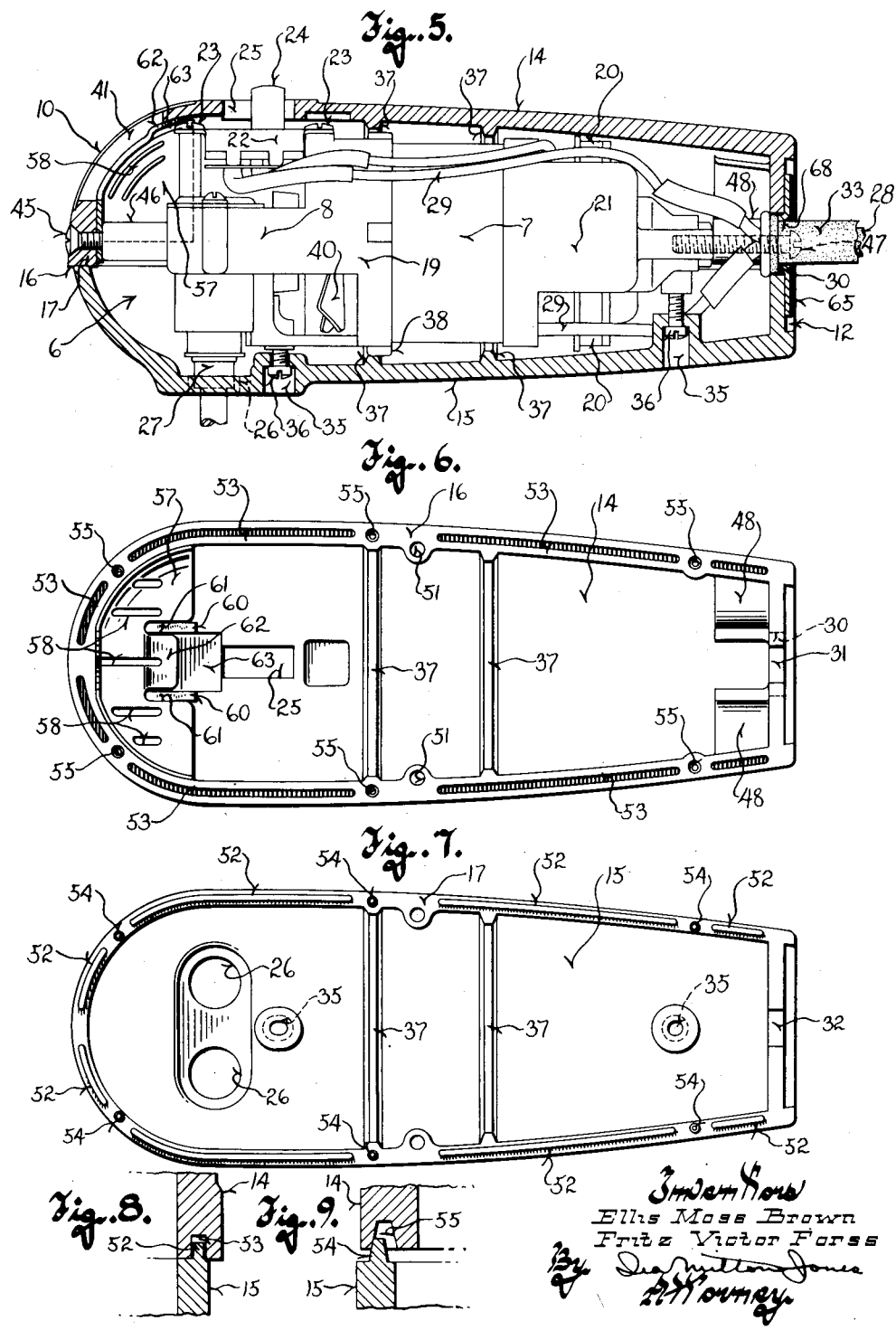

Patented Jan. 15, 1952

2,582,229

UNITED STATES PATENT OFFICE 2,582,229

POWER-DRIVEN PALM GRASPED KITCHEN APPLIANCE

Ellis Moss Brown and Fritz Victor Forss, Racine, Wis., assignors to John Oster Manufacturing Company, Racine, Wis., a corporation of Wisconsin Application December 23, 1949, Serial No. 134,756

11 Claims. (Cl. 172—36)

1

This invention relates to electric motor driven appliances generally, and refers more particularly to relatively small electric motor driven appliances of the portable type adapted to be conveniently held in one hand by the person using the appliance. More specifically this invention is concerned with electric motor driven kitchen appliances similar to that illustrated in Patent No. 2,483,727 issued to Marshall H. Frisbie, October 4, 1949, and Patent No. 2,525,338 issued to E. M. Brown, et al., October 10, 1950.

Appliances of this type are equipped with a relatively small but powerful power unit. This power unit is more or less elongated and includes an electric motor and a drive transmission with which the shaft of a member to be driven is connectable. Compactness of the power unit is a highly important consideration in these appliances since it must fit within an elongated housing which provides a handle of a size to be readily grasped and held in one hand.

While suitable power units of the requisite size and power have been available for some time, the provision of a housing for the power unit presents a more serious problem, and housings heretofore used were not entirely satisfactory. The housing necessarily had to be made in at least two sections, preferably molded of a suitable plastic material; and it has been customary to split the housing transversely into a tubular main section open at one end and long or deep enough to receive nearly the entire power unit, and a hollow end cap for closing the open forward end of the tube. The electric cord which connects with the electric motor inside the housing, of course, passes outwardly through a small hole in the opposite or rear end of the tubular main section and usually has a protective rubber sleeve encircling that portion which passes through the rear end of the housing to prevent damage to the cord and the conductors therein.

This type of housing while capable of being made small enough to be held in one hand by a person using the appliance made it quite an awkward and difficult task to assemble and secure the power unit therein. It also complicated the servicing of the power unit in the event of failure of any part thereof.

Moreover, the complete electric cord could not be attached to the electric motor in advance of assembly of the power unit into the housing. Either the motor end of the cord had to be inserted through the small opening in the rear end of the housing and brought forwardly through the entire tubular main section thereof for connection to the electric motor, or the plug on the outer end of the cord had to be left off until the cord was passed through the opening in the rear of the housing from the interior thereof. In either event it was extremely difficult to force the protective rubber sleeve for the cord through the small opening in the rear wall of the housing, and there was always the possibility of its leads becoming entangled with parts of the motor, or of damage to their connections with the motor during its insertion into the housing.

This invention presents a solution to the problems heretofore encountered in assembling the power unit in the hollow housing of a small portable electric motor driven appliance, and overcomes the objections inherent in the construction of such past appliances through the provision of a hollow elongated housing for the power unit which is split longitudinally into a pair of complementary mating hollow housing sections readily applicable to the power unit from opposite sides thereof. While it is not broadly new to provide an elongated housing which is split longitudinally into complementary mating sections, as is the case in the housing disclosed in Patent No. 2,323,945 issued to A. Strauss et al. July 13, 1943, the present invention provides a novel manner of securing the complementary housing sections in mating relationship enclosing the power unit, and for holding the power unit and particularly the electric motor in spaced relation to the interior walls of the housing.

This invention also provides a novel manner of holding the electric cord properly centered with respect to the housing at the point where it passes out through the rear of the housing.

Another object of this invention is to provide heat absorbing and dissipating means in the hollow housing of an appliance of the character described to preclude burning of those portions thereof which might catch fire if directly subjected to a flame.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a side elevational view of the electric motor driven appliance of this invention;

Figure 2 is a front elevational view of the appliance illustrated in Figure 1, portions thereof being broken away and shown in section;

Figure 3 is a rear elevational view of the appliance;

Figure 4 is a view of the underside of the appliance shown in Figure 1;

Figure 5 is a longitudinal sectional view through the appliance;

Figure 6 is a plan view of the top cover section of the housing viewing the same from the inside thereof;

Figure 7 is a plan view of the bottom cover section viewing the same from the inside;

Figure 8 is a detail sectional view taken through Figure 1 along the plane of the line 8—8; and Figure 9 is a detail sectional view taken through Figure 1 along the plane of the line 9—9.

Referring now more particularly to the accompanying drawings, in which like numerals indicate like parts, the numeral 5 generally designates the elongated hollow housing for the appliance of this invention. The housing has a diameter small enough to be conveniently grasped and held in one hand, as illustrated in Figure 1, so that the person using the appliance has his other hand free to perform various tasks associated with the use of the appliance. The housing is preferably made of plastic, either thermosetting or thermoplastic, and is adapted to completely enclose an elongated power unit generally designated 6.

As will be more fully brought out hereinafter the power unit comprises an electric motor 7 and a drive transmission 8 carried by the electric motor and near the front end wall 10 of the housing. The power unit substantially corresponds to the elongated shape of the housing, but it has transverse and longitudinal dimensions which are smaller than the corresponding dimensions of the housing so that when the power unit is centered in the interior of the housing the electric motor 7 will have its exterior in spaced relationship to the adjacent walls of the housing.

The purpose of the housing 5 is to completely enclose the power unit, and provide a safe and convenient handle for the device. The housing has a more or less cylindrical side wall 11 increasing in diameter from the transverse rear end wall generally designated 12 to the convex front end wall 10.

In accordance with the purposes of this invention the housing is split longitudinally into mating top and bottom sections 14 and 15 respectively, and these sections have mating rim portions 16 and 17 respectively which are in edge to edge engagement along a horizontal plane passing through the housing parallel to its long axis but spaced a slight distance beneath said axis as seen best in Figure 5.

Referring to Figure 5 it will be seen that the drive transmission 8 is carried by the front end frame 19 of the electric motor 7 and that the brush holders 20 are supported by the rear end frame 21 of the motor. The power unit assembly includes an electric switch 22 secured to the power unit by screws 23, one of which passes directly into the front end frame 19 and the other of which is threaded into the forward extremity of the power unit at the drive transmission end thereof. The actuator 24 of the switch projects upwardly therefrom and passes out of the housing through a slot 25 in the top of the upper housing section 14.

At the bottom of the housing and near the forward end thereof its lower section 15 is provided with one or more holes 26 beneath the drive transmission and in line with one or more coupling elements 27 projecting downwardly from the underside of the transmission. Each coupling element is adapted to receive the shaft of a tool to be driven. Merely for purposes of illustration, the shafts may be the stems of cooperating agitators or beaters of the type used in household food mixers.

An electric cord 28 enters the housing through a central hole 30 in the transverse rear end wall 12 of the housing, and has its conductors joined to leads 29 which connect with the electric switch 22 and with one of the brushes in the holders 20. The hole 30 is formed jointly by complementary deep and shallow notches 31 and 32 in the ends of the top and bottom housing sections, respectively, and is just large enough to receive a rubber protecting sleeve 33 which encircles the motor end of the cord. With the housing construction described, it will be apparent that the cord 28 and its sleeve 33 may be laterally placed in the notch 31 in the end of the top housing section during assembly of the power unit in the housing to facilitate such assembly.

The power unit may be and preferably is fixed inside the bottom housing section 15, prior to application of the top housing section over the power unit and securement thereof in mating relationship with the lower section. For this purpose the bottom section is provided with a pair of wells 35 opening to the underside thereof, one near each end of the section, to receive the heads of screws 36 which pass upwardly through the bottom section and thread into adjacent portions of the power unit. Intermediate the screws 36, circumferentially extending reinforcing ribs 37 are formed on both cover sections, and the forward rib in the bottom section in this case is engaged by one or more relatively small lugs 38 on the front frame 19 of the motor to cooperate with the fastening screws 36 in holding the power unit properly centered within the housing and with at least the electric motor 7 spaced from the side walls of the housing.

The purpose of so spacing the electric motor from the side walls of the housing is to enable cooling air to flow over the exterior of the motor, and the circulation of air through the interior of the housing is effected by means of an impeller 40 fixed on the motor shaft (not shown) and arranged to draw air into suitable openings at one end of the housing and out through other openings at the opposite end of the housing. The air ventilating openings 41 in the convex front end are located solely in the top housing section, although similar openings could be provided in the front of the bottom section if desired; and these openings are in the form of vertical slits as seen best in Figure 2. The air ventilating openings 42 in the rear end wall of the housing lie directly adjacent to the side wall of the housing and at either side of vertical ribs 43 which join the rim portions of the end walls on the sections with their side walls.

The top housing section 14 is held in place on the power unit enclosing the upper side thereof by attaching screws passing through the ends of the section lengthwise of the housing and threading into adjacent end portions of the power unit. A single screw 45 is employed for this purpose at the front end of the housing and this screw threads into a boss 46 on the transmission case extending forwardly to the inside of the top cover at the front thereof. At the rear of the housing a pair of screws 47 is employed to fix the top section in place on the power unit. These screws pass forwardly into the end wall 12, near its rim portion at opposite sides of the hole 30, and through bosses 48 on the inside of the wall 12 to thread into the adjacent portions of the power unit as seen in Figure 5. The bosses 48 project forwardly into contact with the adjacent portions of the power unit to thereby hold the same against longitudinal motion relative to the top housing section.

The end screws 45 and 47 alone are capable of holding the power unit properly centered inside the housing and spaced from its side and end walls, but it is preferable to mount the power unit inside the bottom housing section as described previously, leaving the screws 36 somewhat loose until after the top housing section has been applied and the screws 45 and 47 threaded therethrough into the ends of the power unit.

Thereafter the screws 36 are tightened sufficiently to draw the power unit downwardly into the lower housing section and to cause the lug or lugs 38 on the front motor frame to bite into the forward rib 37. This also has the effect of drawing the rim on the lower section into firm edge to edge engagement with that of the upper section, thus closing the joint between the sections. If desired, a pair of screws 50 may be employed to directly connect the two housing sections together. These screws lead upwardly through the sides of the bottom housing section and thread into apertures 51 in the sides of the upper section, and cooperate with the screws 36 to hold the rims of the housing sections tightly engaged. It will be understood, of course, that the screws 50 are not essential in cases where the housing sections can be made sufficiently rigid, or can be reinforced to the extent that its rim portions will be brought into firm engagement with those of the top section solely by tightening the screws 36. If the housing sections are made of a thermosetting plastic, for instance, the screws 50 need not be used.

In the present case also there is an interlocking connection between the mating rims of the housing sections established by the reception of upstanding ridges 52 on the rim of the lower section in slots 53 in the rim of the upper section. This interlocking connection assures that the housing sections will be held in perfect alignment and against shifting longitudinally or laterally relative to one another.

The establishment of the interlocking connection between the cover sections is facilitated by upstanding conical aligning pins 54 embedded in the rim of the lower housing section at several points thereon, and higher than the ridges 52, which pins engage in mating apertures 55 in the rim of the upper section prior to entrance of the ridges in their slots when the sections are drawn together.

When the housing is made of certain thermoplastic materials now commonly employed, there is some danger that the housing will catch fire if directly exposed to flame. This is especially true at the convex front end portions of the housing containing the slit-like air ventilating openings 41 because of the small surfaces which the edges of these openings present; and because the action of the impeller is to draw air into the housing through these openings. Hence, in the presence of a flame in the vicinity of the front of the housing, the draft action set up by the impeller would cause the flame to be drawn against the sides and edges of the air inlet openings 41, or in other words, against those surfaces of the housing most apt to burn.

Adequate protection against the housing catching fire at this point, however, is achieved by the use of a heat dissipating element 57 inside the front end of the housing. The heat dissipating member comprises a metallic shell curved to lie directly against the inside of the front end of the upper housing section and having slits 58 therein aligning with the slits 41 to enable ventilating air to pass through the upper housing section. The lower part of the shell of the member 57 extends downwardly substantially to the rim of the upper housing section and is apertured to receive the front end screw 45 so that this screw serves also to hold the heat dissipating member in place in the housing. Referring to Figure 5 it will be seen that the lower end of the member 57 is also clamped between the inner wall of the upper section and the forward end of the boss 46 into which the screw 45 threads.

The heat dissipating member 57 is held against pivotal motion about the screw 45 by short longitudinal ribs 60 in the top of the upper housing section which engage in slits 61 in the metal shell from which the member is formed. The shell also has a tongue 62 which projects upwardly into a shallow well 63 between the ribs 60 and immediate ahead of the opening 25 for the actuating lever of the switch 22. Hence the tongue 62 and the ribs 60 cooperate with the front screw 45 to hold the heat dissipating member firmly in place and against shifting inside the housing.

If the slitted front end of the housing is directly subjected to flame, it will be apparent that the metallic heat dissipating shell 57 will carry off enough of the heat to prevent heating of the material of the housing to the combustion point and consequently from catching fire.

There is also a metallic heat dissipating plate 65 attached to the rear end of the housing at its exterior to protect the same. This plate has a circular body portion smaller in diameter than the interior of the tubular housing at its rear so as not to obstruct the air ventilating holes 42. Laterally extending ears 66 project from the body of the plate and are apertured to receive the rear end screws 47 of the upper cover section. Hence, it will be appreciated that the screws 47 also hold the plate in place. At its center the plate 65 has an aperture 68 of a size to snugly receive the protective rubber sleeve 33 on the electric cord so as to hold the cord coaxial with the housing.

From the foregoing description taken together with the accompanying drawings it will be apparent to those skilled in the art that the housing for the power unit of the appliance of this invention, being split longitudinally into mating sections and fastened in place on the power unit by individual fastening screws, greatly facilitates assembly and servicing of the appliance and provides a particularly neat appearing enclosure for the electric motor of the appliance.

What we claim as our invention is:

1. In a portable electric motor driven appliance: a hollow elongated housing providing a handle of a size to be conveniently grasped and held in one hand, said housing having side and end walls and being split longitudinally into a pair of complementary mating sections; a power unit in said housing including an electric motor; means providing localized contact between the side of the power unit and one of the sections for spacing said power unit from the side wall of said section; externally accessible fastening means passing through the side of said last mentioned section and secured to the adjacent portions of the power unit for detachably holding said section in place on the power unit covering one side thereof and with the power unit in localized contact with said section; other externally accessible fastening means passing through the ends of the other section and detachably securing the other section over the opposite side of the power unit with the walls of said other section spaced from the power unit, whereby either housing section may be detached independently of the other housing section to expose one entire side of the power unit while leaving the same secured in the other housing section; said housing having ventilating openings in its ends to enable cooling air to flow through the housing; and a transmission forming part of said power unit and having a drive coupling element in line with an opening in the adjacent wall portion of the housing to receive the shaft of a member to be driven.

2. In a portable electric motor driven appliance: a hollow elongated housing providing a handle of a size to be conveniently grasped and held in one hand, said housing having side and end walls and being split longitudinally into a pair of complementary mating sections; a power unit in said housing including an electric motor; and means for detachably holding said sections in mating relationship enclosing the power unit, said means comprising externally accessible fastening elements passing through the side wall of one section and secured to the adjacent side of the power unit, and other externally accessible fastening elements passing through the ends of the other section and secured to the adjacent end portions of the power unit, said fastening elements for each section being independent of those of the other section whereby either housing section may be detached independently of the other section to expose one entire side of the power unit while leaving the power unit secured to the other housing section.

3. In a portable electric motor driven appliance: a hollow elongated housing providing a handle of a size to be conveniently grasped and held in one hand, said housing having side and end walls and being split longitudinally into a pair of complementary mating sections; a power unit in said housing including an electric motor and a power take-off transmission; externally accessible means for holding the housing sections in place about the power unit with their side walls spaced from the power unit, said means comprising fastening elements passing through the end walls of one section and detachably secured to the adjacent portions of the power unit, and other fastening elements passing through the side wall of the other section and detachably secured to both the power unit and the first designated section to draw the sections together, whereby either housing section may be detached from the power unit independently of the other section to expose one entire side of the power unit while leaving the power unit secured to the other housing section; said housing having ventilating openings in its end portions to enable cooling air to flow through the housing; and a coupling element on said power take-off transmission in line with an opening in the adjacent wall portion of the housing to receive the shaft of a member to be driven.

4. In a portable electric motor driven appliance: a hollow elongated housing providing a handle of a size to be conveniently grasped and held in one hand, said housing being split longitudinally into a pair of complementary sections having rim portions in mating edge to edge engagement along a plane extending longitudinally of the housing adjacent to the center thereof; a power unit in said housing including an electric motor and a power take-off transmission; externally accessible means detachably holding the sections in place about the power unit and for holding the power unit in spaced relation to the walls of the housing, said means comprising fastening elements passing through the side of one section and secured to the adjacent portions of the power unit, and other fastening elements passing through the ends of the other section and secured to the adjacent end portions of the power unit; said housing having ventilating openings in its end portions; an impeller driven by the motor inside the handle for effecting forced circulation of cooling air through the housing; and a drive coupling element on said power take-off transmission in line with an opening in the adjacent wall portion of the housing to receive the shaft of a member to be driven.

5. In a portable electric motor driven appliance: a hollow elongated motor housing providing a handle of a size to be conveniently grasped and held in one hand, said housing having side and end walls and being split longitudinally into two complementary hollow sections having rim portions in mating edge to edge engagement along a plane parallel to but spaced a distance to one side of the longitudinal axis of the housing, whereby one of said sections is deeper than the other; a power unit within the housing including an electric motor; and means detachably securing each of said sections to the power unit independently of the other section and with said sections in mating relationship enclosing the power unit, comprising externally accessible fastening screws passing through the ends of said deeper section, lengthwise of the housing and threaded into the adjacent portions of the power unit, and other externally accessible fastening screws passing through the bottom of the other section substantially perpendicularly to said plane and threaded into the adjacent portions of the power unit to hold the rim portions of said sections in mating engagement.

6. In a portable electric motor driven appliance: a hollow elongated housing providing a handle of a size to be conveniently grasped and held in one hand, said housing having side and end walls and being split longitudinally into a pair of complementary mating sections; an elongated power unit in said housing including an electric motor having transverse dimensions smaller than those of the housing; means detachably securing each of said sections to the power unit independently of the other section and with said sections in mating relationship enclosing the power unit, comprising externally accessible fastening means passing through the ends of one of said sections, lengthwise of the housing, and secured to the adjacent portions of the power unit for holding said section in place thereon, and a pair of screws passing through the bottom of said other section at zones thereof spaced longitudinally of the housing and threaded into the adjacent portions of the power unit to draw the same toward the bottom of said other section; and cooperating means on the power unit and said other section having localized engagement and coacting with said screws to maintain the electric motor in spaced relation to the walls of both sections, said cooperating means being located intermediate said screws and providing a fulcrum about which the power unit may rock to facilitate securement of said fastening means to the power unit.

7. In a portable electric motor driven appliance: a hollow motor housing having a wall portion provided with air ventilating apertures and being made of a material susceptible to burning at those portions defining the sides and edges of the ventilating apertures when the exterior of the housing directly is subjected to flame; and a metallic heat absorbing and dissipating member in contact with and covering one side of said apertured wall portion, said heat absorbing member having openings therein registering with and corresponding in size and shape to said ventilating apertures in the housing, and being adapted to absorb and dissipate sufficient heat from a flame and the apertured wall portions against which it may impinge as to preclude burning of the housing along the sides and edges of its ventilating apertures.

8. In a portable electric motor driven appliance: a hollow motor housing having opposite end walls provided with air ventilating apertures to enable cooling air to circulate through the housing, and being made of a material susceptible to burning at those end wall portions defining the sides and edges of the ventilating apertures when said ends of the housing are impinged by a flame; and a metallic heat absorbing and dissipating member overlying each of said end walls and in contact with one side thereof, said heat absorbing and dissipating members having portions lying directly adjacent to the ventilating apertures whereby said members are capable of absorbing and dissipating sufficient heat from a flame and the apertured wall portions against which it may impinge as to preclude burning of the housing at the apertured portions thereof.

9. In a portable electric motor driven appliance: a hollow elongated motor housing having side and end walls and being split longitudinally into complementary mating top and bottom housing sections, said housing having air ventilating apertures in its end walls with the apertures at one end being formed entirely in one housing section, and said housing being made of a material susceptible to burning at those end wall portions thereof defining the sides and edges of the ventilating apertures when the ends of the housing are impinged by a flame; a power unit in said housing including an electric motor; means for securing said housing sections in mating relationship enclosing the power unit; a metal heat absorbing and dissipating member secured inside said housing section at said designated end of the housing and in contact with and covering the apertured end thereof; and another heat absorbing and dissipating member secured to the exterior of the housing at the opposite end thereof; said heat absorbing and dissipating members having portions lying directly adjacent to the ventilating apertures in the ends of the housing whereby the members are capable of absorbing and dissipating sufficient heat from a flame and the apertured end wall portions against which it may impinge as to preclude burning of the housing at said apertured end portions thereof.

10. The portable electric motor driven appliance set forth in claim 1 wherein the means for securing said housing sections in mating relationship includes fastening screws passing through the ends of said designated housing section and the heat absorbing and dissipating members and threaded into adjacent portions of the power unit, so that said screws hold the heat absorbing and dissipating members in place on the housing.

11. In a portable electric motor driven appliance: a hollow motor housing having a wall provided with air ventilating apertures and being made of a material susceptible to burning at those portions defining the edges of the ventilating apertures when the housing is directly subjected to flame; and a heat absorbing and dissipating member overlying and in contact with said apertured wall with portions thereof adjacent to the edges of said ventilating apertures to absorb and dissipate sufficient heat from a flame and the apertured wall portions against which the flame may impinge as to preclude burning of the housing at the edges of its ventilating apertures.

ELLIS MOSS BROWN.
FRITZ VICTOR FORSS.

REFERENCES CITED

The following references are of record in the file of this patent:

UNITED STATES PATENTS

| Number | Name | Date |
|---|---|---|
| 1,525,826 | Perlman | Feb. 10, 1925 |
| 1,965,382 | Kluge | July 3, 1934 |
| 2,247,708 | Jordan | July 1, 1941 |
| 2,264,033 | Youhouse | Nov. 25, 1941 |
| 2,294,713 | Boerger | Sept. 1, 1942 |
| 2,323,945 | Strauss et al. | July 13, 1943 |
| 2,483,727 | Frisbie | Oct. 4, 1949 |

FOREIGN PATENTS

| Number | Country | Date |
|---|---|---|
| 485,709 | Great Britain | May 24, 1938 |